United States Patent
Deans (10) Patent No.: US 8,181,828 B2
(45) Date of Patent: May 22, 2012

(54) SYSTEM AND METHOD FOR STORING AND DISPENSING A POWDER

(75) Inventor: David Deans, Woodland Hills, CA (US)

(73) Assignee: David M. Deans and Jerilyne T. Deans, Woodland Hills, CA (US), Co-Trustees for the David and Jerilyne Deans Family Trust October 8, 2010

( * ) Notice: Subject to any disclaimer, the term of this patent is extended or adjusted under 35 U.S.C. 154(b) by 150 days.

(21) Appl. No.: 12/419,237

(22) Filed: Apr. 6, 2009

(65) Prior Publication Data

US 2010/0096411 A1   Apr. 22, 2010

Related U.S. Application Data

(63) Continuation-in-part of application No. 12/256,393, filed on Oct. 22, 2008.

(51) Int. Cl.
*B67D 7/06* (2010.01)
*A45D 33/02* (2006.01)

(52) U.S. Cl. .......................... 222/282; 222/322; 132/299

(58) Field of Classification Search .................. 222/205, 222/322, 386, 433, 446, 448, 282; 132/298, 132/299, 301, 303
See application file for complete search history.

(56) References Cited

U.S. PATENT DOCUMENTS

| | | | |
|---|---|---|---|
| 1,666,901 A | 7/1925 | Hough | |
| 1,694,727 A * | 12/1928 | Allen | 132/299 |
| 2,140,035 A * | 12/1938 | Sundin et al. | 132/299 |
| 2,446,085 A * | 7/1948 | Gronemeyer et al. | 222/446 |
| 2,460,444 A * | 2/1949 | Bering | 132/299 |
| 2,468,153 A * | 4/1949 | Wolfers | 132/299 |
| 2,581,267 A * | 1/1952 | Majewski | 132/299 |
| 4,109,835 A | 8/1978 | Castro | 222/449 |
| 4,705,051 A | 11/1987 | Bacon et al. | 132/79 |
| 4,982,751 A | 1/1991 | Oishi et al. | 132/299 |
| 5,078,305 A * | 1/1992 | Glynn et al. | 222/446 |
| 6,536,447 B1 | 3/2003 | Fioravanti et al. | 132/299 |
| 6,929,119 B2 * | 8/2005 | Shaki | 206/221 |

OTHER PUBLICATIONS

International Search Report and Written Opinion mailed Apr. 13, 2010 in PCT Appln. Serial No. PCT/US09/60906, 9pgs.
Official Action dated Nov. 17, 2010 issued in U.S. Appl. No. 12/256,393, (13 pgs).

* cited by examiner

Primary Examiner — Kevin P Shaver
Assistant Examiner — Daniel R Shearer
(74) Attorney, Agent, or Firm — Hayes Soloway P.C.

(57) ABSTRACT

A powder dispensing container is provided, the container divided into a powder storage chamber and a powder dispensing chamber with an opening between the two controlled by a valve mechanism. A cap or closure member is disposed over an upper open end of a powder dispensing chamber and when opened, causes a closure of the valve mechanism. When the cover is returned to its closed position, the valve will automatically open allowing for new charge of powder form the storage chamber to enter into the dispensing chamber. The closure member is provided with an actuator that extends through the powder dispensing chamber and engages and causes operation of the valve mechanism.

12 Claims, 6 Drawing Sheets

SYSTEM AND METHOD FOR STORING AND DISPENSING A POWDER

CROSS REFERENCE TO RELATED APPLICATION

This Application is a Continuation-in-Part of my co-pending application Ser. No. 12/256,393 filed Oct. 22, 2008.

BACKGROUND OF THE INVENTION

1. Field of the Invention

This invention relates in general to a container that allows for controlled dispensing of particulate material. The invention has particular utility for use in connection with controlled dispensing of very fine powder, such as a cosmetic powder, and will be described in connection with such utility, although other utilities are contemplated, including, for example, controlled delivery of powdered spices, pharmaceuticals, dyestuffs and other particulate or powdered materials.

2. Description of Related Art

Many of the powders used as cosmetics are lightweight powders with small particle sizes. As a result, these powders can be easily dispersed during use. Although a "fine" or "loose" powder is desirable for use as a cosmetic, it also has the undesirable consequence of becoming difficult to control in use. As a simple example, a user may find it difficult to control free powder and in the process may drop some of the powder on his or her clothing.

Conventional sifter jars transfer small amounts of powder from a storage container through a sifter each time the jar is turned upside down transferring the powder to the surface of the sifter. Frequently, users will open a cosmetic jar only to find that the cosmetic powder billows and disperses in an uncontrollable fashion. This powder can and frequently does find its way into hinges and other small mechanisms causing undue friction and premature wear.

Traditional sifter jars also can become clogged with powder. This may necessitate the removal of the sifter and cleaning by the user. During this process, care must be taken not to disperse the powder contained in the jar. Moreover, some of the cosmetic powders are expensive and loss during removal and cleaning of the sifter is undesirable.

It would therefore be desirable to provide a powder-dispensing jar which does not rely upon a sifter type principle for operation, but which nevertheless controls the use of the powder in such manner that a user dispenses only a limited amount of the powder upon demand and which thereby eliminates an unintended dispersal of the powder.

BRIEF SUMMARY OF THE INVENTION

The invention comprises a powder dispensing jar employing a valve mechanism to control dispensation of the powder.

It is an object of the present invention to provide a powder dispensing jar which does not use a sifter mechanism but rather, relies upon a metering mechanism coupled to a cover member for the jar.

It is another object of the present invention to provide a powder-dispensing jar which allows for the controlled dispensing of a fine powder without a widespread dispersal of the powder.

It is an additional object of the present invention to provide a cosmetic powder-dispensing jar of the type stated which uses a metering valve associated with a partition in the jar and which separates a powder storage chamber from a powder dispensing container with the valve allowing for a limited but controlled amount of powder to be transferred from the powder storage container to a powder dispensing chamber when the cover member for the jar is opened.

It is still a further object of the present invention to provide a powder dispensing jar of the type stated which can be manufactured in a wide variety of sizes and shapes and which is more effective than dispensing cosmetic powder with a sifter jar.

The present invention provides a loose powder dispensing jar which has a base storage unit and cover member where the cover member is subdivided into an upper powder dispensing chamber and metering mechanism located between the powder dispensing chamber and the base powder storage unit.

The invention provides a cosmetic powder dispensing container that employs a unique metering valve mechanism that is opened and closed in response to an opening and closing of a cover on the container or by operation by the user.

As used herein the term "powder" is intended to include particular materials of any size. The present invention provides a powder-dispensing jar that allows for a dispensing of a powder without the unintended and undesirable powder dispersal common to traditional sifter jars. In this respect, the powder-dispensing jar replaces the conventional powder sifter jar that uses a sifter mechanism to control the unintended disbursal of powder with an automatic metering valve.

In a broad aspect, the powder-dispensing jar of the invention has two portions, isolated from one another by a separator. One portion stores the powder and the other is accessible by a user to dispense the powder. In one embodiment, a cover or lid extends over the dispensing portion of the jar. The closure member or cover, which comprises a hinge mounted lid, selectively allows access to controlled quantities of powder which are automatically metered and transferred from storage via a valve mechanism. The closure member, which also covers the upper portion powder-dispensing container, optionally may include a mirror mounted on the underside of the closure member.

A valve mechanism is located in a partition or wall that separates the powder storage chamber from the powder-dispensing chamber. The valve mechanism allows a predetermined amount of powder to pass from the powder storage chamber into the powder-dispensing chamber when the closure member is shifted from one of an opened or closed position to the other of an opened or closed position. In a preferred embodiment, the valve mechanism opens when the closure member is in a closed position, and closes when the closure member is opened. When the container is turned upside down, powder will load the valve mechanism. The container is then turned to an upright position.

In a more specific aspect of the invention, the powder dispensing jar has an internal chamber and a partition is located in the internal chamber and separates the internal chamber into a powder dispensing chamber and a powder holding chamber, sometimes called a "powder receiving chamber" or "storage chamber". The closure member is in the nature of a lid, and preferably, a lid mounted by with a hinge on an actuating section and is opened when raised or moved away from a covering position over the powder dispensing chamber or "dispensing chamber."

In a preferred mode of construction there are three major components to the powder-dispensing jar of the invention. These components constitute an upper closure member or "lid", an intermediate valve actuating section and a lower jar portion which constitutes a powder storing chamber. The valve actuating section cooperates with an actuating element and metering valve in a manner hereinafter described in more detail.

The valve mechanism is associated with the partition, and includes a valve opening between the storage chamber and the dispensing chamber that allows a controlled amount of cosmetic powder to pass through the valve opening into the dispensing chamber. The valve mechanism also includes a valve plate, which can be disposed over the valve opening to close the valve mechanism. The valve opening allows powder from the storage chamber to enter into the dispensing chamber, but only in limited and predetermined or controlled amounts. Similarly, the valve opens and allows for transfer of the powder into the dispensing chamber when the closure member is closed, temporarily precluding access to the dispensing chamber. In one embodiment the storage chamber comprises a single chamber. In another embodiment the storage chamber is divided into a plurality subchambers, each subchamber housing a different powder accessed with its own valve mechanism. This permits a user to select a desired subchamber, as well as adjust the amount of powder transferred from the storage chamber to the dispensing chamber each time the valve mechanism is actuated.

When the user opens the powder-dispensing jar, the valve mechanism closes limiting entry of additional powder into the dispensing chamber. When the closure member is opened, the user can access that limited amount of powder that has already collected onto the upper surface of the valve plate. The powder-dispensing jar also may include a metering member, which extends over the valve opening and thereby controls the amount of powder that is transferred from the storage chamber into the dispensing chamber when the valve is opened. The metering member blocks powder from transferring through the valve opening to the dispensing chamber when the closure member for the jar is in a closed position. In effect, the valve mechanism allows for transfer of a controlled quantity of powder from the storage chamber and through the valve mechanism into the dispensing chamber when the lid on the closure member is opened. The amount of loose powder that is loaded onto the valve can be controlled by increasing or decreasing the surface area or volume of the valve itself. Additionally, the amount of loose powder that is loaded onto the valve can be controlled by increasing or decreasing the surface area or volume of the valve that is exposed to the powder in the storage chamber.

The overall process is as follows: a user shifts the lid of the closure member to an open position to enable delivery of a predetermined amount of powder from the metering valve. Opening of the lid also causes the valve plate of the valve mechanism to automatically close restricting communication between the storage chamber and dispensing chamber when the lid is open. In like manner, when the closure member is closed, the valve plate of the valve mechanism is opened allowing for a charge of powder to be transferred from the powder receiving chamber to the metering valve, in a manner further described in more detail hereinafter.

This invention possesses many other advantages and has other purposes which may be made more clearly apparent from a consideration of the forms in which it may be embodied. These forms are shown in the drawings forming a part of and accompanying the present specification. They will now be described in detail for purposes of illustrating the general principles of the invention. However, it is to be understood that the following detailed description and the accompanying drawings are not to be taken in a limiting sense.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

Elements and parts in the figures are illustrated for simplicity and have not necessarily been rendered according to any particular sequence or embodiment.

DETAILED DESCRIPTION OF THE INVENTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention. It should be noted that there are many different and alternative configurations, devices and technologies to which the disclosed inventions may be applied. The full scope of the inventions is not limited to the examples that are described below.

Referred now in more detail and by reference to the drawings, a powder-dispensing jar 10 has a base 12 defining a central interior chamber 14 and a closure member or closure member assembly 16. A hinge 11 on the jar base 12 supports the closure member 16. The closure member may also be attached to the base by, e.g. a living hinge.

A suitable latching mechanism such as a push button actuated latch 18 may be provided for releasing of the closure member 16 from the jar base 12, when it is desired to open the jar.

In a preferred embodiment, as described herein, a hinge 11 is mounted on the opposite side of the jar from the latch 18 so that the closure member 16 will always be in a proper position to mate with the latching mechanism. The details of the latching mechanism are not shown, and any latching mechanism could be employed. The closure member 16 may have an internal ring seal 22 (see FIG. 2) so that there is a sealing member located between the closure member 16 and the jar base 12 when the closure member 16 is closed.

Figures 1, 2:
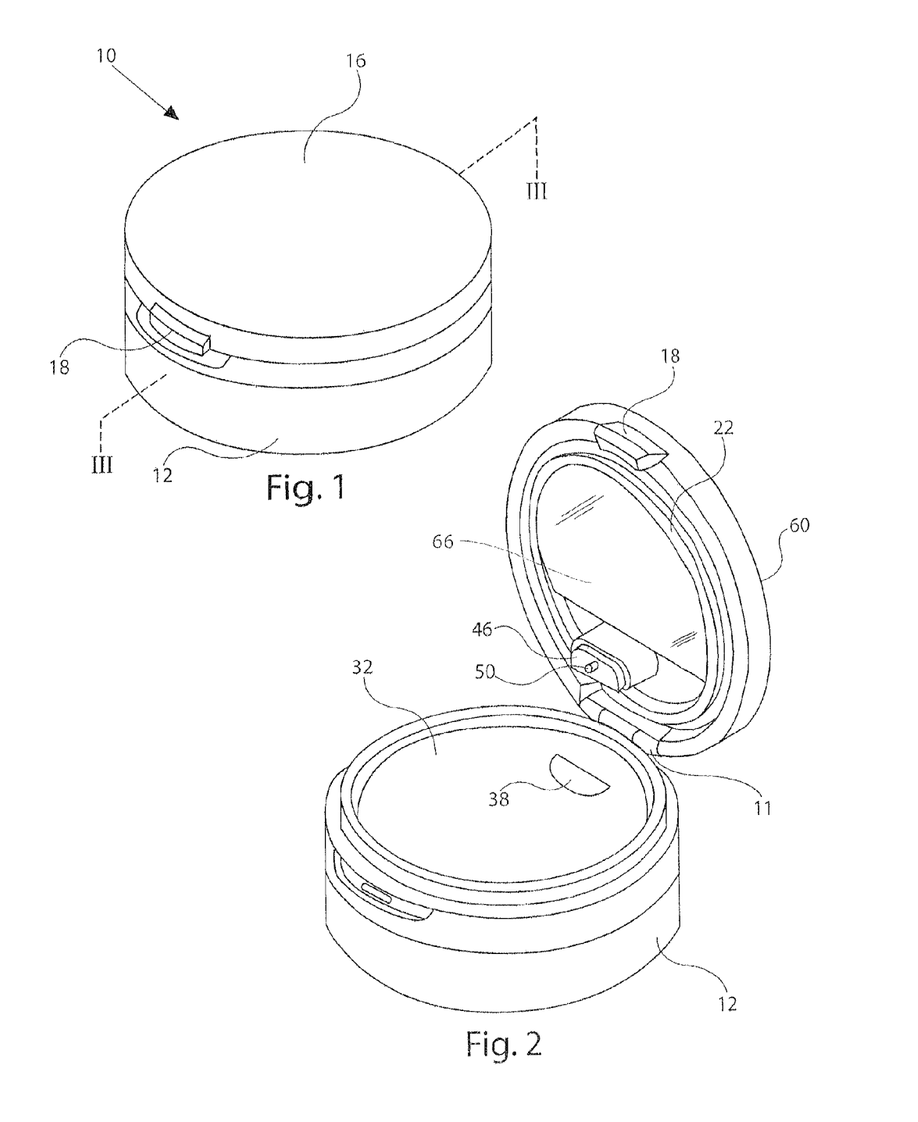
FIG. 1 is a perspective view of a powder-dispensing jar in accordance with the present invention.
FIG. 2 is a perspective view of the powder-dispensing jar with a lid thereof opened.
Figure 3:
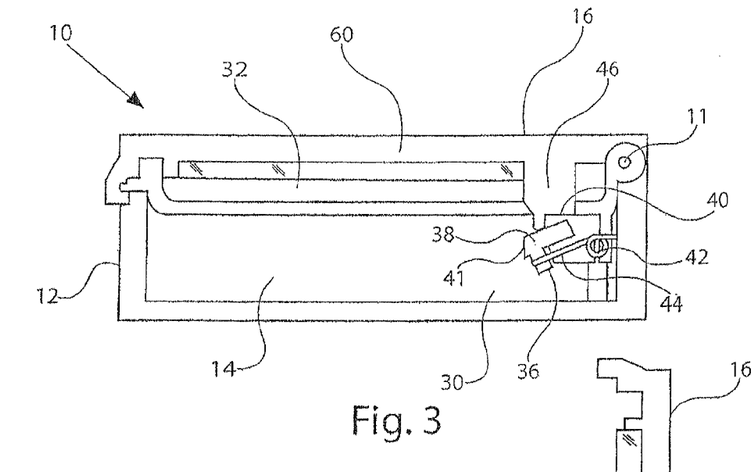
FIG. 3 is a sectional view taken along line 3-3 of FIG. 1 and showing the portions of the operating mechanism of the powder-dispensing jar of FIG. 1 when a closure member is in a closed position.
Figure 4:
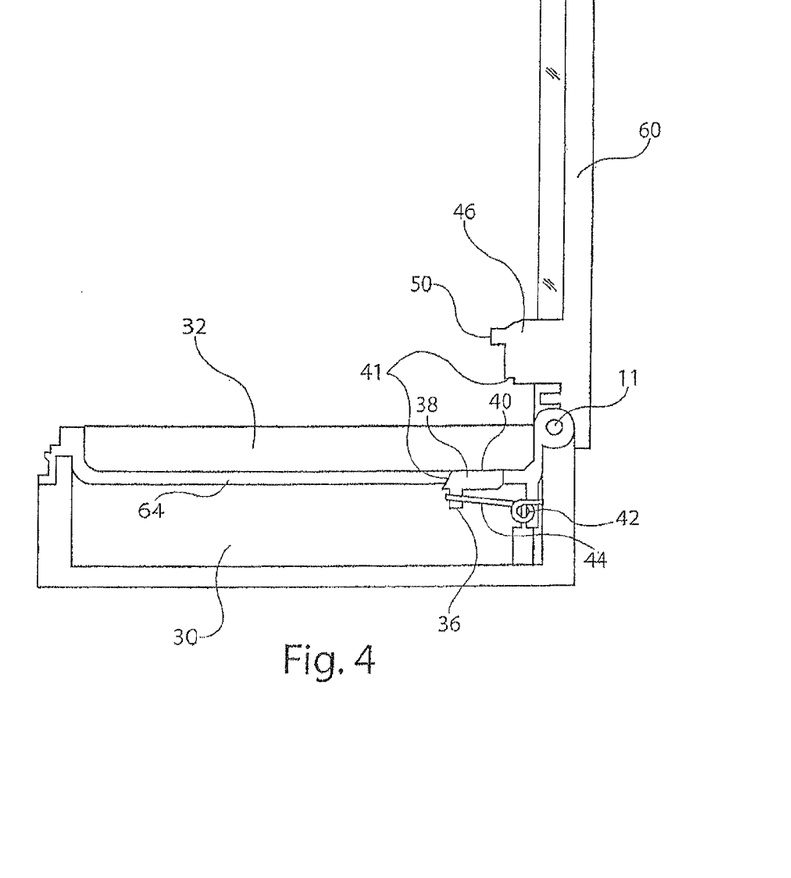
FIG. 4 is a sectional view showing a portion of the powder-dispensing jar of the present invention when the closure member is raised and opened.
Figure 5:
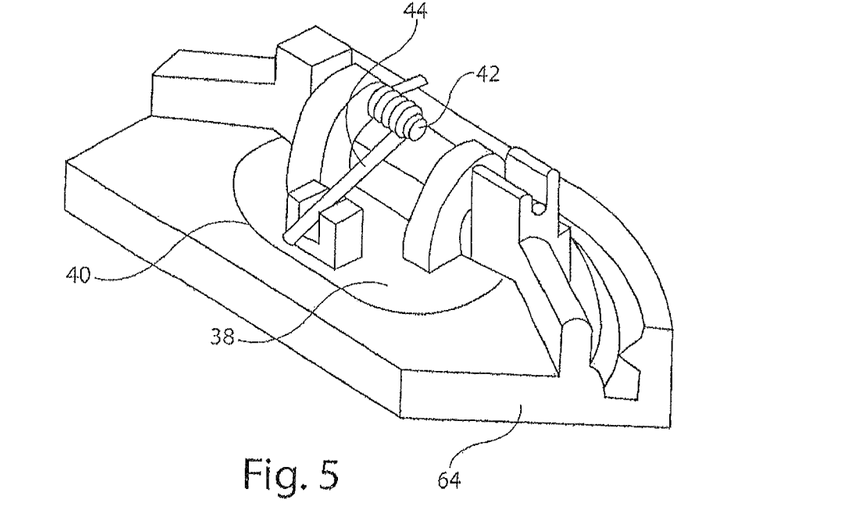
FIG. 5 is a fragmentary perspective view, showing the underside of a valve mechanism when closed.
Figure 6:
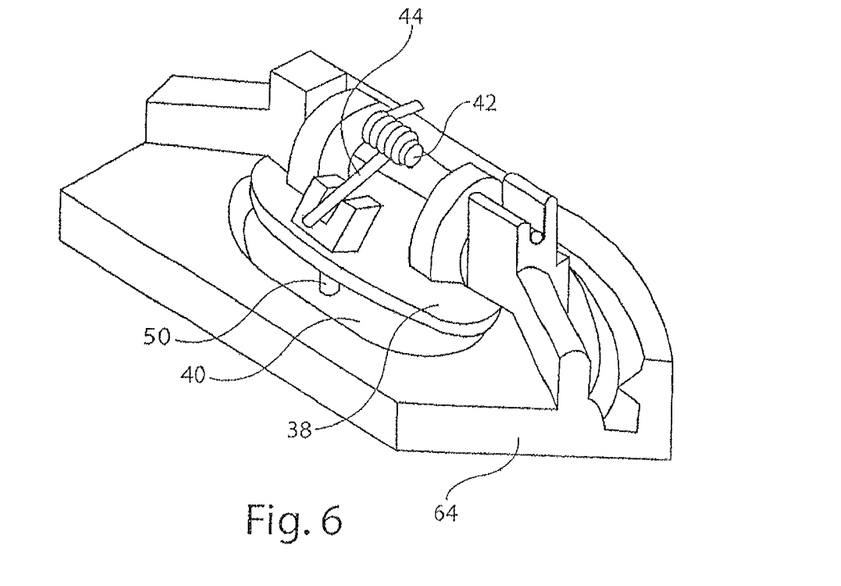
FIG. 6 is a fragmentary perspective view showing the under-side of the valve mechanism forming part of the powder-dispensing jar when opened.
Figure 7:
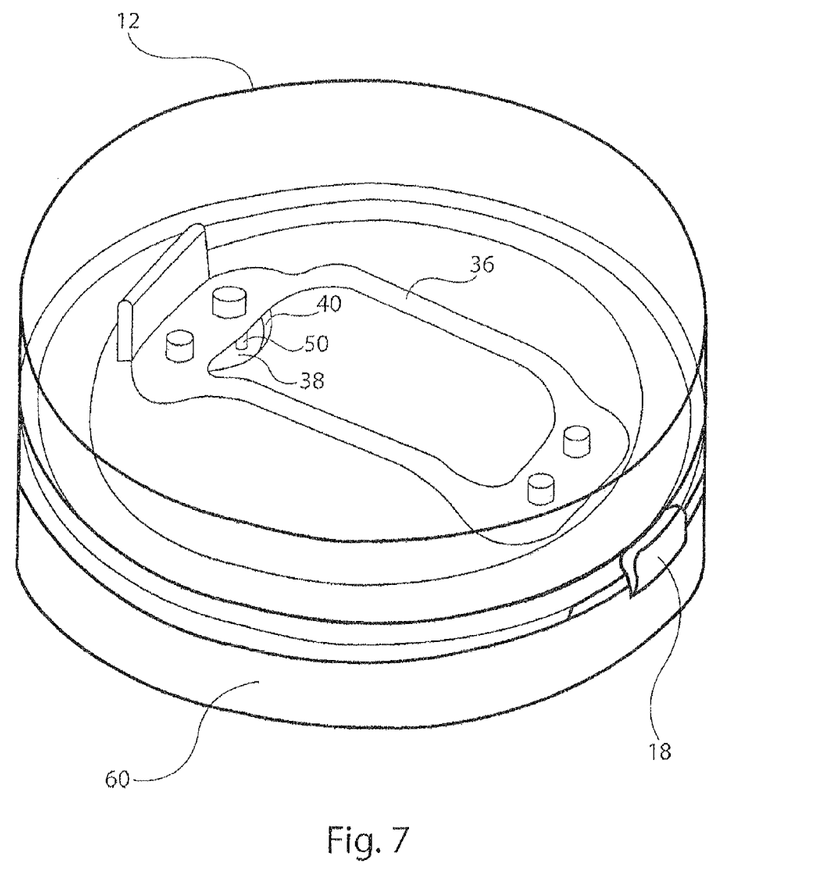
FIG. 7 is a partial perspective view showing an alternate spring mechanism when the powder-dispensing jar is upside-down.
Figure 8:
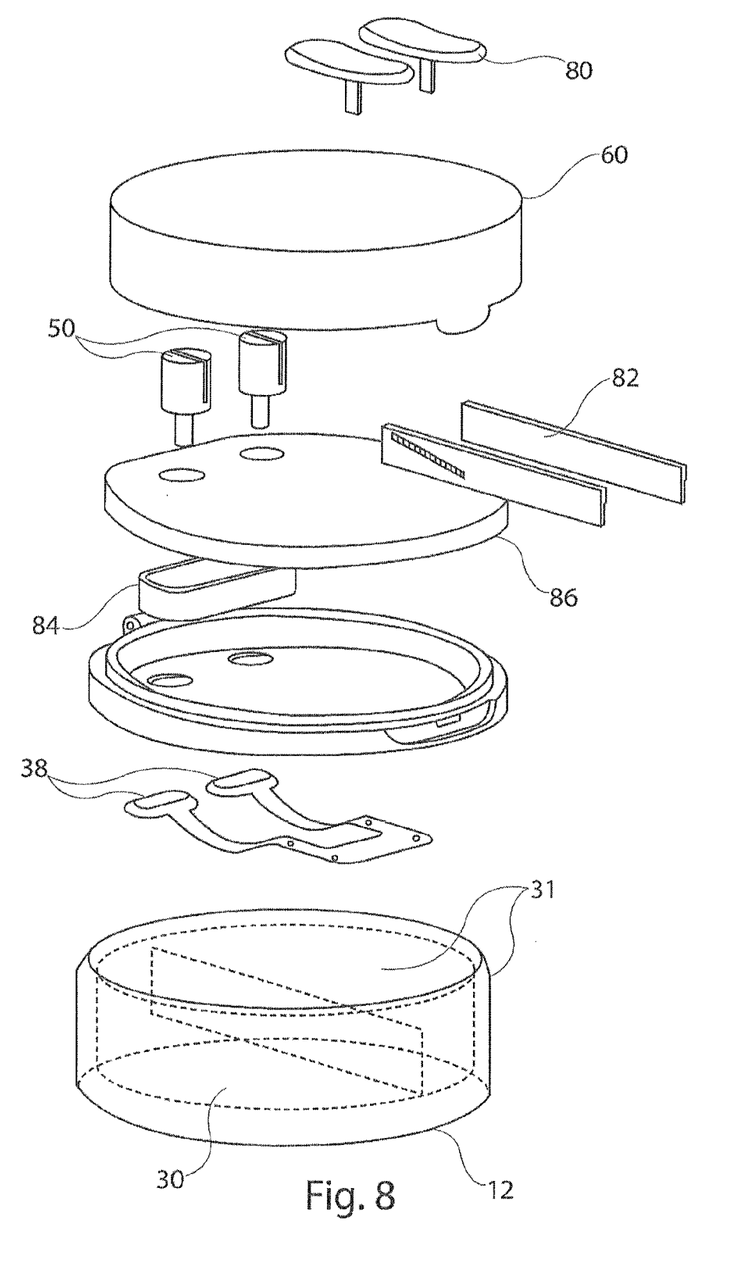
FIG. 8 is an exploded view showing a powder dispensing jar having an adjustable actuator valve mechanism and a powder storage chamber that is separated into a plurality of subchambers.

The closure member 16 is comprised of two major operating components, the first of which is an intermediate partition 64. The closure member 16 is also comprised of a closure cap 60 and an internal ring seal 22, which engages the upper end of the jar in the manner as shown in FIGS. 2 and 3 and thereby forms a seal with the jar base when in the closed position. The partition 64 also may contain a valve mechanism 36. The partition 64 effectively divides the interior chamber into a lower powder storage chamber 30 and an upper powder dispensing chamber 32 as shown in FIGS. 3 and 4. The powder storage chamber 30 optionally may be configured to concentrate powder near the valve mechanism 36. Alternatively, as shown in FIG. 8, the powder storage chamber may be separated into a plurality of subchambers 31, wherein each subchamber may house a different powder to be dispensed. The closure cap may also include a mirror 66 mounted on the underside of the closure member (see FIG. 2).

In the construction as illustrated, the powder storage chamber is partially enclosed by the lower surface of the partition 64. A valve mechanism 36, which comprises a valve plate 38 that is shiftable in a valve opening 40 is mounted in the storage chamber 30. By reference to FIG. 3, it can be observed that the valve plate 38 and the valve opening 40 each have a tapered edge 41 (see FIGS. 3 and 4) such that any excess powder would tend to fall into the powder storage chamber 30. The valve plate 38 is pivotal on a pin 42 and is spring-biased to a closed position by means of a spring mechanism 44. In the case of a storage chamber 30 having multiple subchambers 31 illustrated in FIG. 8, each subchamber may have its own valve mechanism 36, or the user may move a single valve mechanism 36 over the desired subchamber (via, for example, rotation of the upper dispensing chamber 32 relative to the storage chamber 30).

By further reference to FIGS. 2 and 3, it can be seen that there is a block or plug 46 located on the underside of the lid 60 of the closure member 16. This plug 46 extends over the valve opening 40 and controls the amount of powder that can be released from the storage chamber to the dispensing chamber 32 by affecting the opening of the valve plate 38 and blocking any unwanted communication between the storage chamber 30 and the dispensing chamber 32.

In accordance with this construction, it can be seen that the valve mechanism 36 controls the amount of powder that passes from the powder storage chamber 30 and is introduced into the powder-dispensing chamber 32.

The valve mechanism 36 is constructed in such manner that it effectively seals the valve opening 40 when in the closed position. However, when opened, it will allow a regulated amount of powder to enter into the powder-dispensing chamber 32. Moreover, the plug 46 also limits the amount of powder that enters into the powder dispensing chamber when in the closed position by providing a sealing surface between the powder dispensing chamber 32 and the powder storage chamber 30.

In one embodiment, there is an actuating or metering pin 50 on the underside of the plug 46 that engages the valve plate 38 causing the valve plate 38 to open when the closure member 16 is located in a closed position over the upper end of the jar. The actuating or metering pin 50 also limits the amount of powder that passes to the valve plate 38 based on the contact surface area of the pin to the valve plate, which has a blocking effect of the powder. Thus the spring mechanism 44 ensures that when the closure member is released, the closure member will be biased upwardly. This will cause the valve mechanism to completely close. However, before closing, a small amount of the powder is introduced into the powder-dispensing chamber 32. In effect, there is a metering of a controlled amount of powder into the dispensing chamber 32.

When the jar is turned upside down, before complete closure of the valve member, some powder is caused to collect on the upper surface of the valve plate before the plate moves to the closed position. When the jar is again reoriented, some of the powder will remain on the valve plate. Thus, as the valve plate is moved to the fully closed position, a controlled amount of the powder remaining on the valve plate will effectively enter the powder-dispensing chamber. In effect, there is a metering of the amount of powder into the powder-dispensing chamber.

The closure member 16, in and of itself, does not allow powder into storage chamber 30. It is only when the lid 60 is open with respect to the partition 64 that the powder can transfer from the storage chamber 30 into the powder-dispensing chamber 32. In other words, when the lid 60 of the closure member is opened, powder cannot enter into the powder-dispensing chamber 32 from the powder storage chamber 30.

When the user of the powder dispensing jar desires to obtain a selected amount of powder, the user merely needs to turn the jar over or shake the jar slightly so that the powder will collect on the valve plate before the valve plate moves to the closed position. When the user opens the lid 60, the plug 46 is released from the valve plate 38 and allows the valve plate 38 to move to the fully closed position. As a result, no further powder can move from the powder storage chamber 30 into the powder-dispensing chamber 32. Nevertheless, opening of the lid 60 allows the user to obtain that amount of powder that has been introduced in the powder-dispensing chamber 32. When the lid 60 and the entire closure member 16 is moved to the closed position, the valve 36 will open since the plug 46 or the actuating pin 50 will contact the valve plate 38 and move the same to the open position. This will allow the powder to collect upon the valve plate 38 in the manner as previously described.

The amount of the powder allowed to pan between chambers will be a function, in part, of the size of the valve plate 38. Obviously, if the valve plate 38 has a large overall surface area, it will tend to collect more powder and in like manner a lesser surface area will cause a collection of a lesser amount of powder. In addition, the length of the valve actuator 50 will affect the opening of the valve plate 38 and allow more of the powder to remain on the valve plate 38. If the actuator 50 has a shorter length, then the valve is opened less, and less powder may collect on the valve plate. As will be discussed in greater detail below, the effective length of actuator 50 may be adjustable to allow a user to select the amount of powder that is allowed onto the valve plate 38.

The distance of movement of the valve plate 38 is also a factor to be considered since a smaller distance of travel will cause the valve plate 38 to remain open less, thereby limiting the amount of powder that will collect on the valve plate. Further, the size of the valve opening 40 is a controlling factor since a small valve opening 40 will only allow a limited amount of powder to collect on the valve plate 38.

Figure 9:
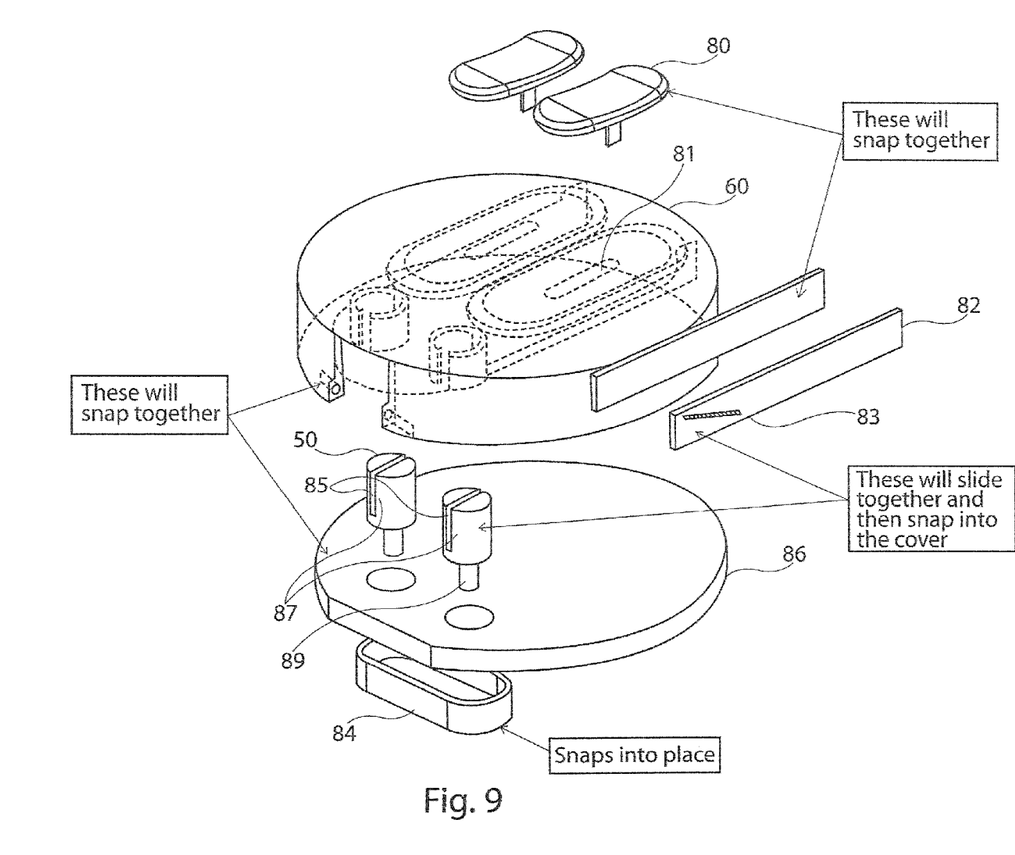
FIG. 9 is an exploded view showing details of the adjustable actuator value mechanism.

Referring in particular to FIGS. 8 and 9, in another embodiment, the actuator 50 may be variably controllable such that the user may adjust the length of the actuator 50, and therefore the amount of powder transferred between the storage chamber 30 and the dispensing chamber 32. In this embodiment, the actuator 50 may be controlled by any suitable mechanism, such as a knob, slide mechanism, or push-button mechanism. For example, the devices may include user adjustable thumb slides 80 coupled to levers 82. The levers 82 in turn are coupled to the actuators 50. Levers 82 include angled raised ridges or tracks 83, which ride in guide slots 85 in actuators 50, which in turn are formed in the sidewalls of raceways 87. Thumb slides 80, levers 82 and actuators 50 are snap fitted together. With this arrangement lateral movement of thumb slides 80 thumb in slots 81 carries levers 82 which ride in slots 87 in actuators 50, causing actuators 50 to ride up or down, which changes the effective length of actuators 50. Varying the effective length of the actuators 50 varies the amount of powder allowed to collect on the valve plates 38 as described above. In the case of a storage chamber 30 having subchambers 31 and multiple valve mechanisms 36, the actuator 50 also may be adjusted such that its associated opening in the lid 60 of the container remains closed, whereupon no powder will be shifted from the corresponding subchamber 31 to the dispensing chamber 32. Guide member 84 support and guide the distal ends 89 of actuators 50, and also ensures that powder is not admitted to the dispensing chamber when the lid 60 is closed.

In contrast to sifter jars, which utilize a sifting mechanism, it has been found that a valve-type metering mechanism of the present invention is far more effective in eliminating a wide dispersal of the powder in a dressing room or other environment.

The powder-dispensing jar can be made in a variety of sizes and shapes. Typically the powder-dispensing jar will be relatively small since it is largely designed for use with cosmetic powders. It should be understood that the jar and the dispensing mechanism could be used with essentially any type of finely dispersed powder. The powder-dispensing jar can preferably be made of a variety of plastics that are easily injection molded or made from other known molding techniques. Moreover, since there are a limited number of operating components, the powder-dispensing jar is highly effective in operation and requires little or no maintenance. The jar can be cleaned when emptied and reused for other powders, refilled, or disposed of.

It should be understood that many changes, modifications, variations and other uses and applications will become apparent to those skilled in the art after considering the specification and the accompanying drawings. While the present invention has been described with particularity in connection with the controlled delivery of powdered cosmetics, the invention also advantageously may be used for the controlled delivery of other particulate or powdered materials including spices, pharmaceuticals, dyestuffs, and the like. Therefore, any and all such changes, modifications, variations and other uses and applications which do not depart from the spirit and scope of the invention are deemed to be covered by the invention.

The invention claimed is:

1. A powder dispensing container comprising a separator isolating a powder storage chamber from a powder dispensing chamber;

a lid hingedly coupled to the powder dispensing chamber and configurable between an opened position and a closed position; and a valve supported by the separator and coupled to the lid such that the valve opens when the lid is moved from an opened position to a closed position, thereby allowing communication between the powder storage chamber and the powder dispensing chamber, and the valve closes when the lid is moved from a closed position to an opened position, wherein the valve allows a repeatably controlled amount of powder to pass from the powder storage chamber to the powder dispensing chamber and wherein the valve comprises a user adjustable mechanism to permit a user to adjust the repeatably controlled amount of powder passed from the powder storage chamber to the powder dispensing chamber when the lid is in a closed position.

2. The powder dispensing container of claim 1 wherein the powder to be dispensed is selected from the group consisting of a cosmetic powder, a pharmaceutical, a spice and a dyestuff.

3. The powder dispensing container of claim 1 wherein the valve allows a predetermined amount of powder to pass from the powder storage chamber to the powder dispensing chamber upon creating the opening in the separator.

4. The powder dispensing container of claim 1 wherein the valve comprises a plate configured to open when the lid is in the closed position; said valve further comprising a spring configured to close the plate when the lid is in the opened position.

5. The powder dispensing container of claim 4 wherein the lid further comprises a member that exerts a force on the plate of the valve.

6. The powder dispensing container of claim 1 wherein the valve comprises a metering member that allows a controlled amount of powder to move between the powder storage chamber and the powder dispensing chamber.

7. The powder dispensing container of claim 6, wherein the metering member is configured to open the valve plate by a predetermined distance to meter the amount of powder allowed to pass from the powder storage chamber to the powder dispensing chamber upon creating the opening in the separator.

8. The powder dispensing container of claim 7 wherein the metering member also limits the amount of powder that passes to the valve plate based on the powder blocking effect of the contact surface area of the member to the valve plate.

9. The powder dispensing container of claim 1 wherein the valve comprises an actuator configured to close or open the valve in response to the opening or closing of the lid.

10. The powder dispensing container of claim 7 wherein the metering member is at least partially immersed in the powder when the valve is opened.

11. The powder dispensing container of claim 1 further comprising a mirror attached to the lid.

12. The powder dispensing container of claim 1, wherein the user adjustable actuator mechanism is selected from the group consisting of a knob, a slide-mechanism and a push-button mechanism.

* * * * *